United States Patent
Kawahara

(10) Patent No.: US 11,195,321 B2
(45) Date of Patent: Dec. 7, 2021

(54) INFORMATION PROCESSING APPARATUS, INFORMATION PROCESSING SYSTEM, INFORMATION PROCESSING METHOD, AND STORAGE MEDIUM

(71) Applicant: CANON KABUSHIKI KAISHA, Tokyo (JP)

(72) Inventor: Takuto Kawahara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/847,966

(22) Filed: Apr. 14, 2020

(65) Prior Publication Data
US 2020/0342657 A1  Oct. 29, 2020

(30) Foreign Application Priority Data

Apr. 24, 2019  (JP) .............................. JP2019-083242
Jun. 11, 2019  (JP) .............................. JP2019-108888

(51) Int. Cl.
*G06T 15/00* (2011.01)
*G06T 15/20* (2011.01)
(Continued)

(52) U.S. Cl.
CPC ............... *G06T 15/20* (2013.01); *G06T 7/11* (2017.01); *G06T 7/194* (2017.01); *G06T 7/593* (2017.01); *H04N 13/282* (2018.05)

(58) Field of Classification Search
CPC .... H04N 5/232; H04N 5/247; H04N 5/23206; H04N 13/282; G06T 7/593; G06T 15/20; G06T 7/11; G06T 7/194
(Continued)

(56) References Cited

U.S. PATENT DOCUMENTS 8,465,160 B2 * 6/2013 Yamada ................. G02B 1/118
359/601
10,019,809 B2 * 7/2018 Yang .................... G01B 11/002
(Continued)

FOREIGN PATENT DOCUMENTS

JP  2008-191072 A  8/2008
JP  2018-207252 A  12/2018

OTHER PUBLICATIONS

Jordt A, Köser K, Koch R. Refractive 3D reconstruction on underwater images. Methods in Oceanography. Apr. 1, 2016;15:90-113.*

(Continued)

*Primary Examiner* — Phu K Nguyen
(74) *Attorney, Agent, or Firm* — Canon U.S.A., Inc. IP Division

(57) ABSTRACT

An information processing apparatus includes a first detection unit configured to detect a first object located on a first direction side of a refracting surface from an image obtained by an imaging apparatus located on the first direction side, a second detection unit configured to detect a second object located on a second direction side of the refracting surface from an image obtained by an imaging apparatus located on the second direction side, an obtaining unit configured to obtain position information indicating at least either one of a positional relationship between the first and second objects and positions of the first and second objects, and an identification unit configured to identify positions of the plurality of imaging apparatuses in a common coordinate system, based on a result of detection performed by the first detection unit, a result of detection performed by the second detection unit, and the position information.

18 Claims, 11 Drawing Sheets

(51) Int. Cl.
   *G06T 7/593* (2017.01)
   *H04N 13/282* (2018.01)
   *G06T 7/194* (2017.01)
   *G06T 7/11* (2017.01)

(58) Field of Classification Search
   USPC .......................................................... 345/418
   See application file for complete search history.

(56) References Cited

U.S. PATENT DOCUMENTS 10,797,269 B2* 10/2020 Hao ..................... C09D 133/14
2019/0353975 A1* 11/2019 Didomenico ............ G02B 1/06

OTHER PUBLICATIONS

Anwer A, Ali SS, Khan A, Mériaudeau F. Underwater 3-d scene reconstruction using kinect v2 based on physical models for refraction and time of flight correction. IEEE Access. Aug. 2, 2017;5:15960-70.*

Zhang C, Zhang X, Zhu Y, Li J, Tu D. Model and calibration of underwater stereo vision based on the light field. Measurement Science and Technology. Sep. 6, 2018;29(10):105402.*

* cited by examiner

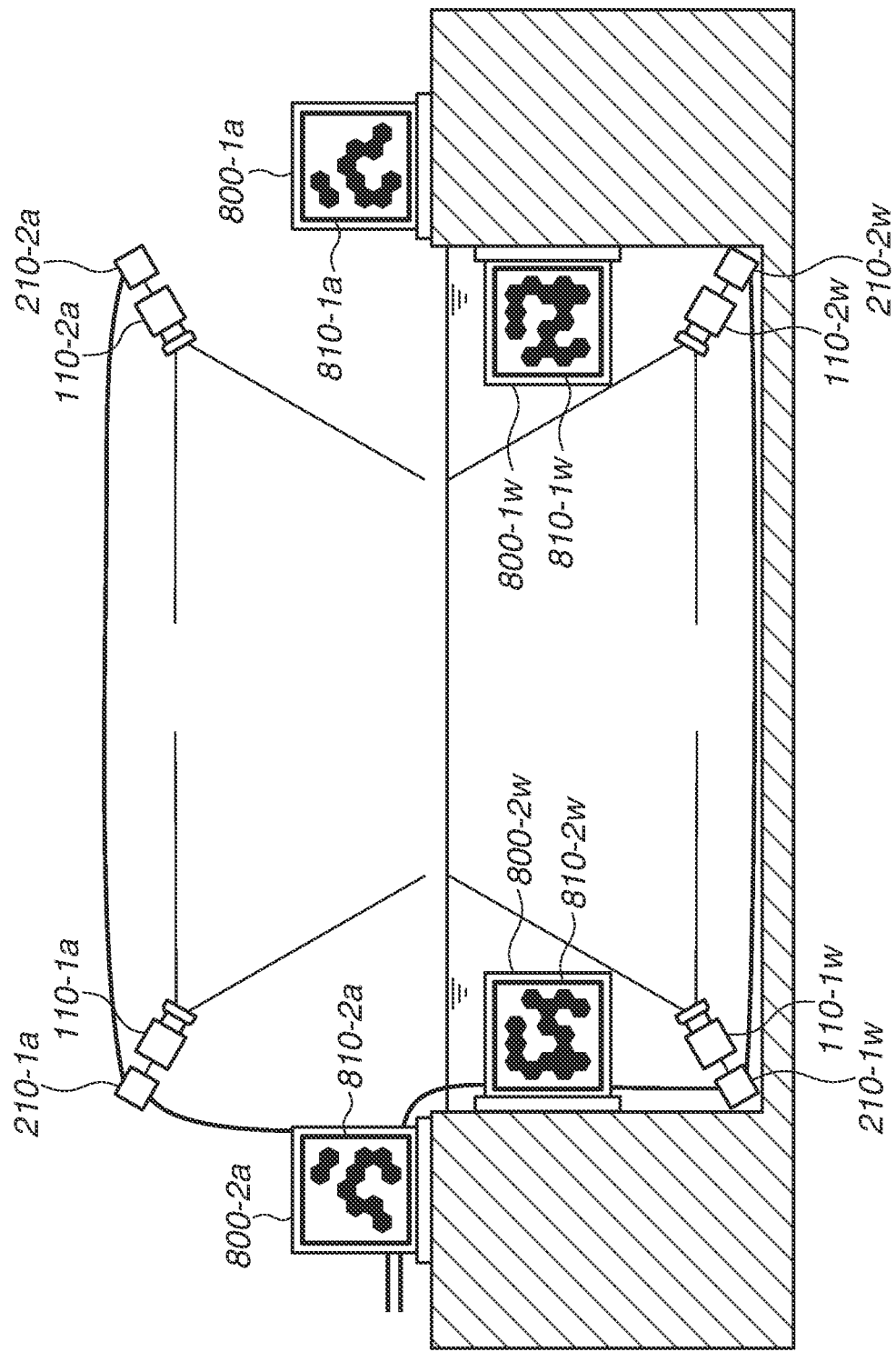

VIEW IN DIRECTION OF ARROW A

VIEW IN DIRECTION OF ARROW B

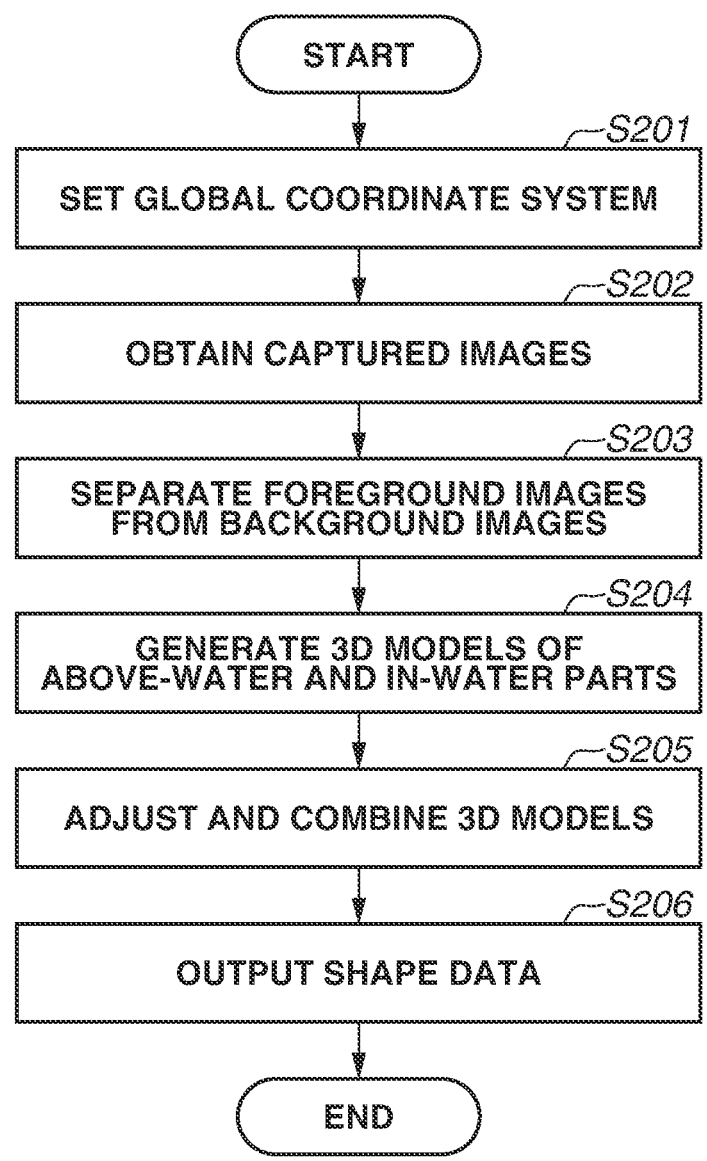

INFORMATION PROCESSING APPARATUS, INFORMATION PROCESSING SYSTEM, INFORMATION PROCESSING METHOD, AND STORAGE MEDIUM

BACKGROUND

Field of the Disclosure

The present disclosure relates to a technique for identifying a position of an imaging apparatus based on a captured image, and a technique for generating shape data on an object based on captured images.

Description of the Related Art

There is a technique for installing a plurality of imaging apparatuses at different positions, performing synchronous imaging, and generating a virtual viewpoint image of which the point of view can be freely changed by using a plurality of captured images obtained by the synchronous imaging. More specifically, the virtual viewpoint image is generated by generating three-dimensional shape data on an object included in the captured images based on the plurality of captured images, and performing rendering processing based on the position and direction of a virtual viewpoint.

To generate the three-dimensional shape data on the object based on the captured images obtained by the plurality of imaging apparatuses, the positions of the respective imaging apparatuses needs to be identified in a common coordinate system. Japanese Patent Application Laid-Open No. 2018-207252 discusses identifying the positions of a respective plurality of imaging apparatuses in a common coordinate system by using a plurality of images obtained by capturing images of the same marker by the imaging apparatuses.

According to a method discussed in Japanese Patent Application Laid-Open No. 2018-207252, the identification results of the positions of the plurality of imaging apparatuses can be erroneous if the plurality of imaging apparatuses is located on both sides of an interface between a plurality of regions filled with substances having different refracting indexes. For example, in a case where a virtual viewpoint image is generated with an aquatic sport such as artistic swimming as an imaging target, imaging apparatuses can be installed above and below the water surface. Since the air and water have different optical refractive indexes, the imaging apparatuses are unable to stably detect a marker located on the other side of the water surface due to occurrence of light reflection at the water surface and fluctuations of the water surface. If images captured when the marker is installed only in the water are used, the identification results of the positions of the imaging apparatuses arranged above the water surface can be erroneous. Similarly, if images captured when the marker is installed only in the air are used, the identification results of the positions of the imaging apparatuses arranged below the water surface can be erroneous.

Japanese Patent Application Laid-Open No. 2008-191072 discusses a technique for correctly identifying a three-dimensional shape of a target object even if there are imaging apparatuses that only cover part of the object in their imaging range. More specifically, Japanese Patent Application Laid-Open No. 2008-191072 discusses identifying three-dimensional shapes of individual parts of an object by using captured images obtained by imaging apparatuses that cover the respective parts of the object with their imaging range. Japanese Patent Application Laid-Open No. 2008-191072 also discusses generating shape data expressing the three-dimensional shape of the entire object by combining the identified three-dimensional shapes of the respective parts.

According to the conventional techniques, shape data expressing the three-dimensional shape of an object can be erroneous if the object exists on both sides of a refracting surface where light is refracted. For example, in a case where a virtual viewpoint image is generated when an aquatic sport such as artistic swimming is the imaging target, the body of a swimmer as a target to generate shape data can exit in part above the water surface (above water) and in part below the water surface (in the water). Since the air and water have different optical refractive indexes, an object on the other side of the water surface as seen from an imaging apparatus can appear distorted in the captured image due to occurrence of light reflection at the water surface and fluctuations of the water surface. If shape data on the in-water part of the competitor's (swimmer's) body is generated by using a captured image obtained by an imaging apparatus in the air covering the in-water part with its imaging range, shape data correctly expressing the three-dimensional shape of the competitor's body can fail to be generated.

SUMMARY

According to an aspect of the present disclosure, an information processing apparatus includes a first detection unit configured to detect a first object located on a first direction side of a refracting surface from an image obtained by an imaging apparatus located on the first direction side of the refracting surface among a plurality of imaging apparatuses configured to capture images of an imaging region including at least part of the refracting surface, light being refracted at the refracting surface in a three-dimensional space, a second detection unit configured to detect a second object located on a second direction side of the refracting surface from an image obtained by an imaging apparatus located on the second direction side of the refracting surface among the plurality of imaging apparatuses, the second direction side being an opposite side of the first direction side with respect to the refracting surface, an obtaining unit configured to obtain position information indicating at least either one of a positional relationship between the first and second objects and positions of the first and second objects, and an identification unit configured to identify positions of the plurality of imaging apparatuses in a common coordinate system, based on a result of detection performed by the first detection unit, a result of detection performed by the second detection unit, and the position information obtained by the obtaining unit.

Further features of the present disclosure will become apparent from the following description of exemplary embodiments with reference to the attached drawings.

BRIEF DESCRIPTION OF THE DRAWINGS

FIG. 6 is a diagram illustrating an installation example of markers.

FIG. 9 is a flowchart illustrating an example of processing related to generation of shape data.

DESCRIPTION OF THE EMBODIMENTS

Figure 1:
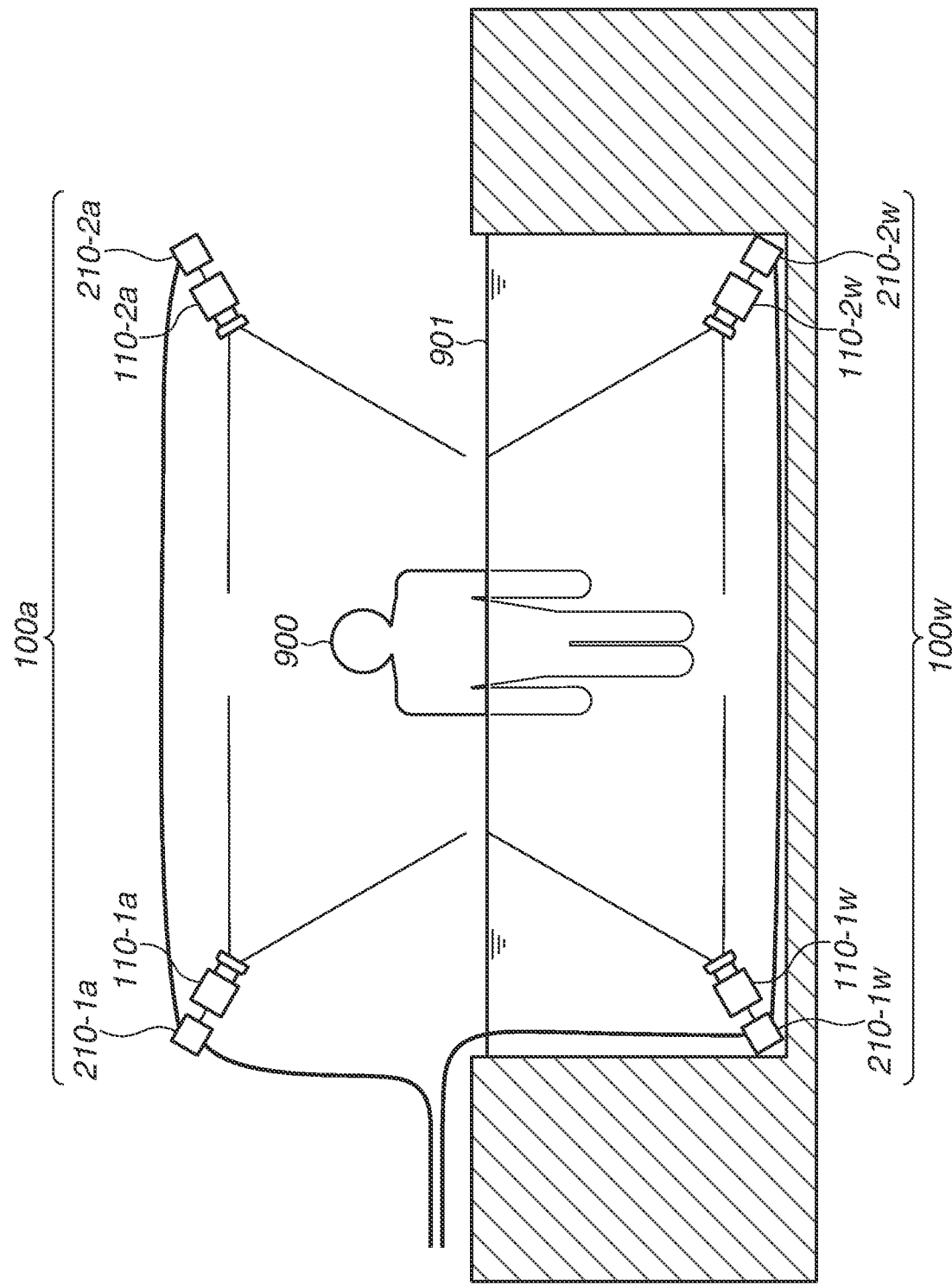
FIG. 1 is a diagram illustrating an installation example of camera systems.

Exemplary embodiments of the present disclosure will be described in detail below with reference to the drawings. Configurations described in the following exemplary embodiments are merely examples, and the present disclosure is not limited to the illustrated configurations.

[Configuration of Information Processing System]

A configuration example of an information processing system 10 will be described with reference to FIGS. 1 and 2. The information processing system 10 is a system for generating a virtual viewpoint image expressing an appearance from a specified virtual viewpoint based on a plurality of images (multi-viewpoint images) captured by a plurality of imaging apparatuses and the specified virtual viewpoint. The virtual viewpoint image according to the present exemplary embodiment is also referred to as a free-viewpoint video image. However, the virtual viewpoint image is not limited to an image corresponding to a point of view freely (arbitrarily) specified by a user, and includes, for example, an image corresponding to a point of view that the user selects from a plurality of candidates. In the present exemplary embodiment, a case where the virtual viewpoint is specified by a user operation will be mainly described. However, the virtual viewpoint may be automatically specified based on a result of image analysis. In the present exemplary embodiment, a case where the virtual viewpoint image is a moving image will be mainly described. However, the virtual viewpoint image may be a still image.

The information processing system 10 includes a plurality of cameras serving as imaging apparatuses that capture images of an imaging region in a plurality of directions. In the present exemplary embodiment, the imaging region to an imaging target is near a swimming pool where aquatic sports such as an artistic swimming, a swimming race, and a water polo are played. The plurality of cameras is installed at different positions to surround such an imaging region, and synchronously captures images. The plurality of cameras included in the information processing system 10 is classified into a plurality of imaging apparatus groups corresponding to different installation locations. In the example illustrated in FIG. 1, an in-air camera system 100a is an imaging apparatus group including a plurality of cameras 110a installed above the water surface, specifically, in the air around the swimming pool. The in-air camera system 100a mainly captures images in the air above the water. An in-water camera system 100w is an imaging apparatus group including a plurality of cameras 110w installed below the water surface, specifically, at the corners of the swimming pool in the water. The in-water camera system 100w mainly captures images in the water. Both the in-air camera system 100a and the in-water camera system 100w in the water capture images of the imaging region, which includes at least part of the water surface of the swimming pool. The water surface is an interface between an in-air region and an in-water region.

With such a camera installation configuration, images of an entire object 900 such as a swimmer can be captured even if the object 900 lies across above and in the water in the swimming pool as illustrated in FIG. 1. Thus, images of the above-water part of the entire object 900 lying in the air (e.g., the upper half of the swimmer's body) are captured at least by the cameras 110a in the air. Images of the in-water part of the entire object 900 lying in the water (e.g., the lower half of the swimmer's body) are captured at least by the cameras 110w in the water.

The plurality of cameras does not necessarily need to be installed all around the imaging region. Depending on restrictions on installation positions, the plurality of cameras may be installed in only some of the directions of the imaging region. FIG. 1 illustrates cameras 110-1a, 110-2a, 110-1w, and 110-2w. FIG. 2 further illustrates cameras 110-3a and 110-3w. However, the number of cameras is not limited thereto. For example, the in-air camera system 100a and the in-water camera system 100w may each include about 30 cameras. The imaging object is not limited to the foregoing, either. The number of cameras may be changed based on the imaging object. Cameras with different functions, such as telephoto cameras and wide-angle cameras, may be installed.

As employed herein, components each denoted by a reference numeral with the alphabetical letter "a" at the end are located in the air. Components each denoted by a reference numeral with the alphabetical letter w at the end are located in the water. The cameras included in the in-air camera system 100a will be referred to as cameras 110a if no distinction is intended. The cameras included in the in-water camera system 100w will be referred to as cameras 110w if no distinction is intended. The cameras, whether in the air or in the water, will be referred to simply as cameras 110 if no distinction is intended. Similar notation is used for the reference numerals of other components in the in-air and in-water camera systems 100a and 100w.

Figure 2:
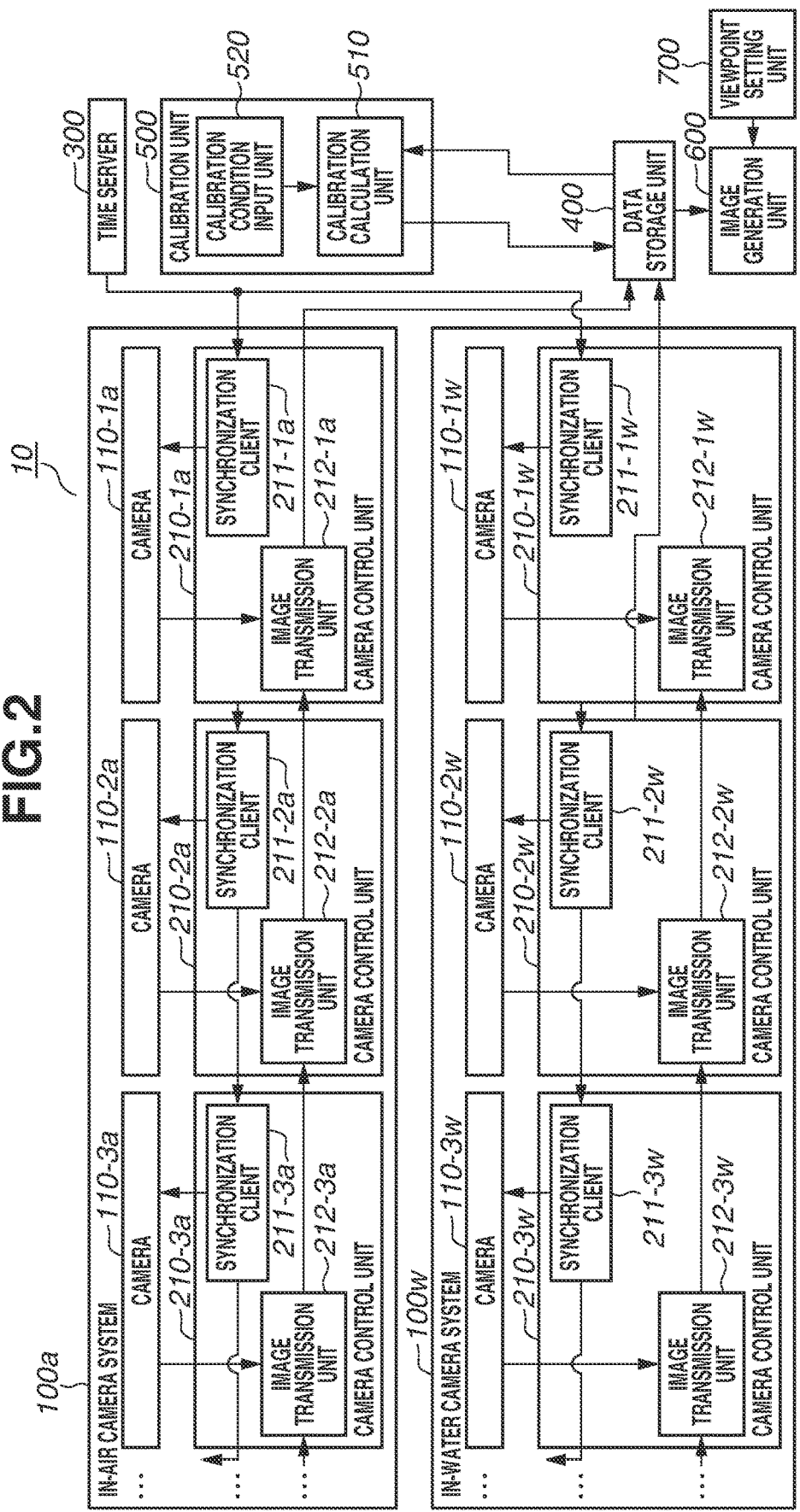
FIG. 2 is a block diagram illustrating a configuration example of an information processing system.

As illustrated in FIGS. 1 and 2, the plurality of cameras 110a included in the in-air camera system 100a is daisy-chained via respective corresponding camera control units 210a. The plurality of cameras 110w included in the in-water camera system 100w is similarly daisy-chained via respective corresponding camera control units 210w. The in-air and in-water camera systems 100a and 100w do not necessarily need to be separately connected. The in-air and in-water camera systems 100a and 100w may be connected in series. The cameras 110 do not necessarily need to be daisy-chained, either. The plurality of camera control units 210 may be connected in network topology such as star topology.

The plurality of cameras 110a included in the in-air camera system 100a is installed at positions and in directions appropriate to capture images above the water in the swimming pool. For example, the focal lengths and focuses of the cameras 110a are set so that images of a position of interest such as near the water surface can be captured with predetermined image quality. Similarly, the cameras 110w included in the in-water camera system 100w are installed at positions and in directions appropriate to capture images in the water in the swimming pool. The focal lengths and focuses of the cameras 110w are set so that images of a position of interest such as near the water surface can be captured with predetermined image quality. In the present exemplary embodiment, the cameras 110w included in the in-water camera system 100w have a waterproof function and are directly installed in the water. However, this is not restrictive, and the cameras 110w may be accommodated in waterproof housings installed in the water. The swimming pool may be made of transparent acrylic glass, and the cameras 10w may be installed outside the swimming pool so that images in the water can be captured from below the water surface.

As illustrated in FIG. 2, the in-air camera system 100a includes the plurality of cameras 110a and the plurality of camera control units 210a respectively connected to the cameras 110a. Each camera control unit 210a includes a synchronization client 211a and an image transmission unit 212a. The plurality of camera control units 210a included in the in-air camera system 100a is daisy-chained, and the endmost camera control unit 210-1a is connected to a time server 300 and a data storage unit 400. The in-water camera system 100w has a similar configuration.

The synchronization client 211 in each camera control unit 210 communicates with the time server 300 and the synchronization clients 211 of other camera control units 210 to perform synchronization processing. The Precision Time Protocol (PTP) is used as a synchronization protocol. However, the synchronization protocol is not limited thereto. The plurality of cameras 110 are synchronized by the respective synchronization clients 211 outputting a Gen-Lock signal and a timecode to the cameras 110 based on a result of the synchronization processing. The plurality of cameras 110 then synchronously captures images. The cameras 110 output obtained captured images and a timecode indicating the imaging time to the image transmission units 212 of the respective camera control units 210. The image transmission units 212 transmit the captured images obtained from the cameras 110 to the data storage unit 400.

The data storage unit 400 stores various types of information used to generate a virtual viewpoint image as well as the captured images obtained by the camera 110. The information stored in the data storage unit 400 includes information obtained by calibration performed by a calibration unit 500. The calibration unit 500 includes a calibration calculation unit 510 (hereinafter, referred to as a calculation unit 510) and a calibration condition input unit 520 (hereinafter, referred to as an input unit 520), and performs calibration based on captured images obtained from the data storage unit 400. The calibration performed by the calibration unit 500 is information obtaining processing for obtaining camera parameters of each of the plurality of cameras 110 included in the information processing system 10. The camera parameters to be obtained by the calibration includes at least parameters indicating the respective positions of the cameras 110. However, this is not restrictive. The camera parameter to be obtained by the calibration may include parameters indicating the orientations of the cameras 110, parameters indicating the focal lengths of the cameras 110, and parameters indicating the states of lens distortion of the cameras 110. Details of the calibration processing will be described below.

An image generation unit 600 obtains multi-viewpoint images and the information (camera parameters) obtained by the calibration from the data storage unit 400, and generates a virtual viewpoint image based on the multi-viewpoint images, the information, and viewpoint information obtained from a viewpoint setting unit 700. The viewpoint information used to generate the virtual viewpoint image is information indicating the position and direction of a virtual viewpoint. More specifically, the viewpoint information is a parameter set including parameters expressing a three-dimensional position of the virtual viewpoint, and parameters expressing directions of the virtual viewpoint in pan, tilt, and roll directions. The contents of the viewpoint information are not limited thereto. For example, the parameter set serving as the viewpoint information may include a parameter expressing the size (angle of view) of the field of view of the virtual viewpoint. The viewpoint information may include a plurality of parameter sets. For example, the viewpoint information may include a plurality of parameter sets corresponding to a respective plurality of frames constituting a virtual viewpoint moving image, and indicate the positions and directions of the virtual viewpoint at a plurality of consecutive points in time, respectively. The viewpoint setting unit 700 generates viewpoint information based on a user operation, and outputs the viewpoint information to the image generation unit 600.

For example, a virtual viewpoint image is generated by the following method. First, foreground images and background images are obtained from a plurality of images (multi-viewpoint images) obtained by the plurality of cameras 110 capturing images in respective different directions. The foreground images are formed by extracting foreground regions corresponding to an object such as a person or a ball. The background images are formed by extracting background regions other than the foreground regions. A foreground model expressing a three-dimensional shape of the person or the like and texture data for coloring the foreground model are generated based on the foreground images. Texture data for coloring a background model expressing a three-dimensional shape of the background such as a swimming pool is generated based on the background images. The foreground model is generated by using information about the positions and orientations of the respective cameras 110. Specifically, the camera parameters obtained by the calibration performed by the calibration unit 500 is used. The texture data is mapped onto the foreground model and the background model, and rendering is performed based on the virtual viewpoint indicated by the viewpoint information, whereby a virtual viewpoint image is generated. However, the method for generating a virtual viewpoint image is not limited thereto, and various methods may be used. Examples thereof include a method for generating a virtual viewpoint image by projective transformation of captured images without using a three-dimensional model. The image generation unit 600 outputs the generated virtual viewpoint image to a display device and/or a storage device.

[Hardware Configuration]

Figure 3:
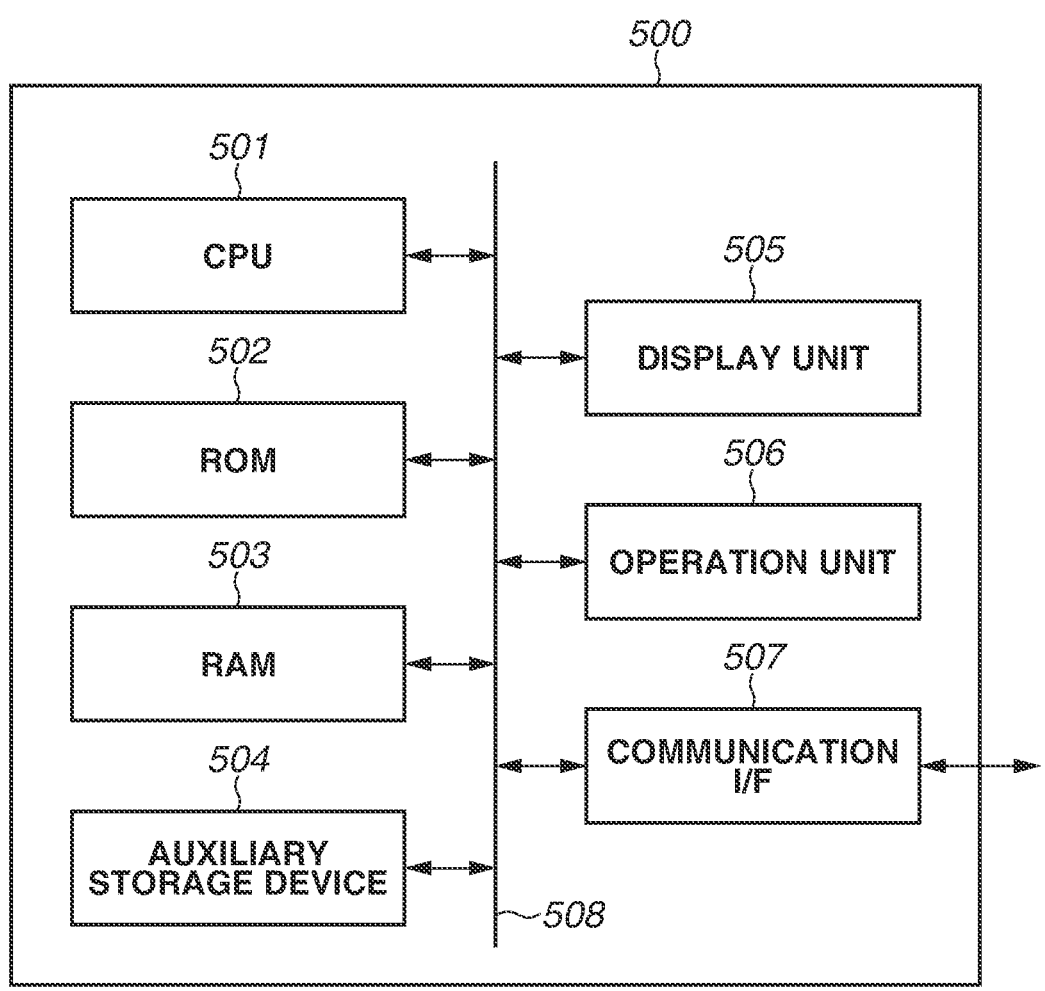
FIG. 3 is a block diagram illustrating a hardware configuration example of an apparatus.

Next, a hardware configuration of the calibration unit 500 that is one of the information processing apparatuses included in the information processing system 10 will be described with reference to FIG. 3. Other apparatuses included in the information processing system 10, such as the camera control units 210 and the image generation unit 600, may have a similar hardware configuration to that of the calibration unit 500. The calibration unit 500 includes a central processing unit (CPU) 501, a read-only memory (ROM) 502, a random access memory (RAM) 503, an auxiliary storage device 504, a display unit 505, an operation unit 506, a communication interface (I/F) 507, and a bus 508.

The CPU 501 implements functions of the calibration unit 500 by controlling the entire calibration unit 500 with use of computer programs and data stored in the ROM 502 and the RAM 503. The calibration unit 500 may include one or a plurality of pieces of dedicated hardware different from the CPU 501, and the dedicated hardware may execute at least part of the processing by the CPU 501. Examples of the dedicated hardware include an application specific integrated circuit (ASIC), a field-programmable gate array (FPGA), and a digital signal processor (DPS). The ROM 502 stores programs that do not need to be changed. The RAM 503 temporarily stores programs and data supplied from the auxiliary storage device 504, and data supplied from outside via the communication I/F 507. The auxiliary storage device 504 includes a hard disk drive, for example. The auxiliary storage device 504 stores various types of data such as captured images and the information obtained by the calibration.

The display unit 505 includes a liquid crystal display and a light-emitting diode (LED), for example. The display unit 505 displays a graphical user interface (GUI) for a user to operate the calibration unit 500. Examples of the operation unit 506 include a keyboard, a mouse, a joystick, and a touch panel. The operation unit 506 receives the user's operations and inputs various instructions to the CPU 501. The CPU 501 operates as a display control unit that controls the display unit 505, and an operation control unit that controls the operation unit 506. The communication I/F 507 is used to communicate with an external apparatus. For example, if the calibration unit 500 is connected to an external apparatus in a wired manner, a communication cable is connected to the communication I/F 507. If the calibration unit 500 has a function of wirelessly communicating with an external apparatus, the communication I/F 507 includes an antenna. The bus 508 connects the components in the calibration unit 500 and transmits information.

In the present exemplary embodiment, the display unit 505 and the operation unit 506 are included in the calibration unit 500. However, at least either one of the display unit 505 and the operation unit 506 may exist as a separate apparatus. The display unit 505 and the operation unit 506 may be omitted.

[Calibration Processing]

The calibration unit 500 performs calibration by using calibration images captured before the start of a scene, such as a competition, that is a virtual viewpoint image generation target. In the following description, the capturing of images to obtain images for performing calibration (calibration images) will be referred to as calibration imaging. The capturing of images of a scene to be a virtual viewpoint image generation, which is performed after calibration imaging, will be referred to as scene imaging. If a virtual viewpoint image is not generated in real time and generated based on recorded captured images, calibration imaging may be performed after the scene imaging.

Calibration imaging is performed in a state where a reference object is placed in the imaging region. In the present exemplary embodiment, the reference object is a marker 810 that can be detected from captured images obtained by the cameras 110. A board 800 displaying the marker 810 is installed at a position capable of being imaged by the plurality of cameras 110. The marker 810 may be printed on the board 800. Alternatively, the board 800 may include a display for displaying the marker 810. The shape of the board 800 and the reference object are not limited to such an example.

Figure 4:
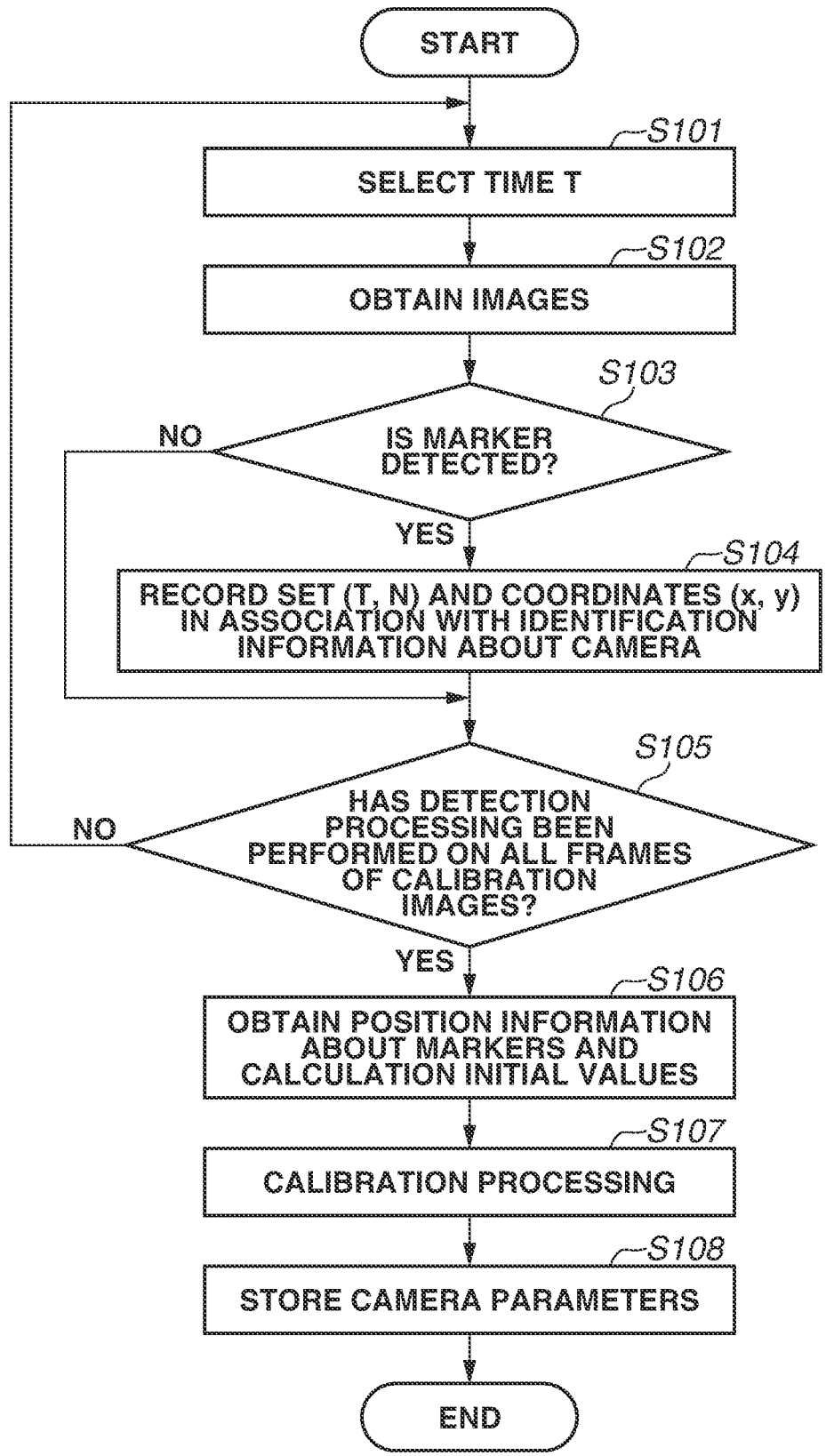
FIG. 4 is a flowchart illustrating an example of processing related to calibration.
Figure 5:
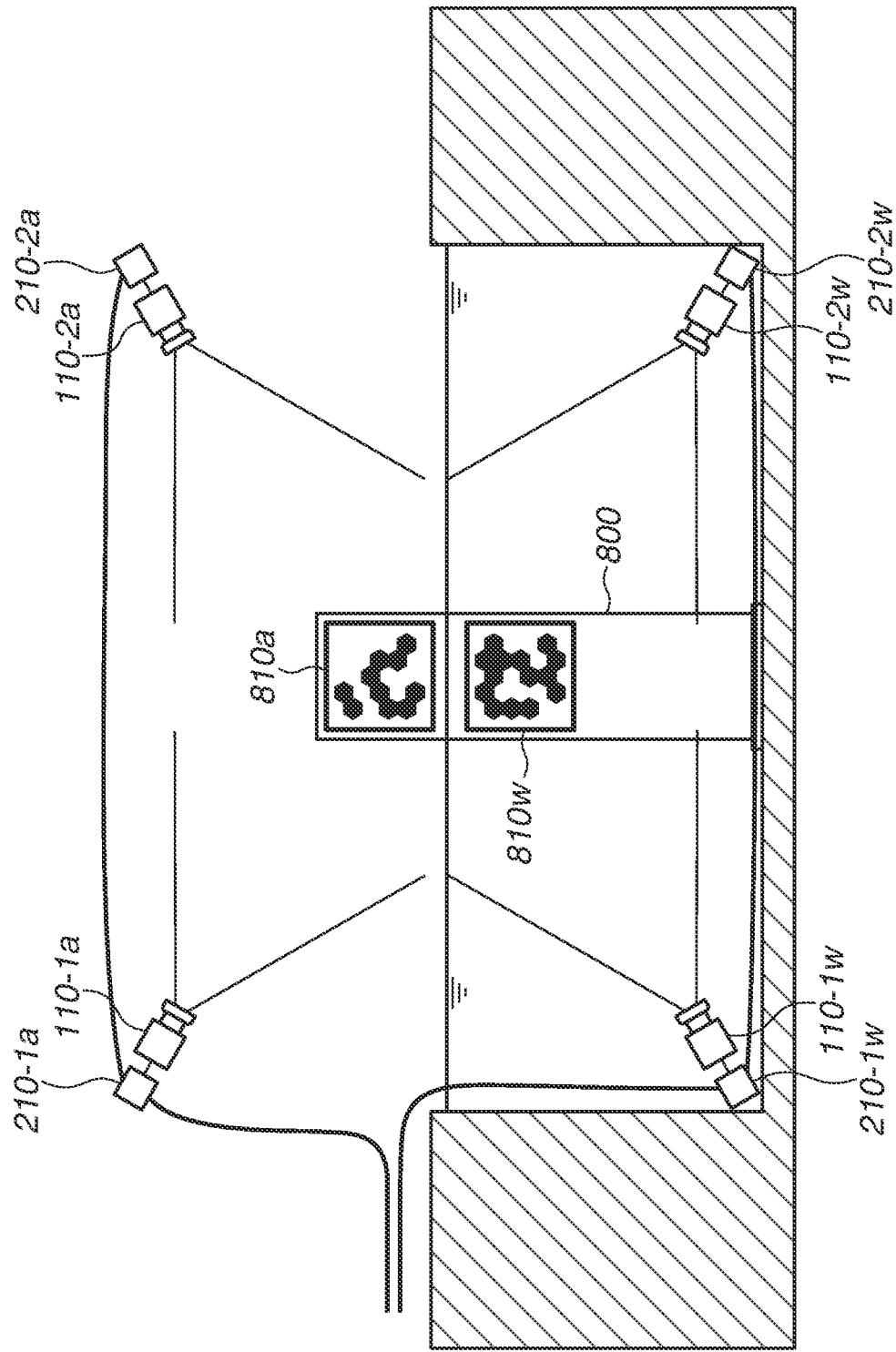
FIG. 5 is a diagram illustrating an installation example of markers.

FIG. 5 illustrates an example of the imaging region at a time of calibration imaging. The board 800 is an object that includes two markers 810a and 810w and exists across both regions above the water surface (in the air) and below the water surface (in the water). The marker 810a is located on a part of the board 800 in the air. The marker 810w is located on a part of the board 800 in the water. The cameras 110-1a and 110-2a in the air can capture images of the marker 810a. The cameras 110-1w and 110-2w in the water can capture images of the marker 810w. The markers 810 are two-dimensional markers having respective different contents. For example, identification information about the markers 810 can be read from the captured images of the markers 810. However, the contents of the markers 810 are not limited thereto. In the following description of FIG. 4, the board 800 is assumed to be movable in the swimming pool. However, the board 800 may be fixed to a predetermined position on the bottom of the swimming pool.

Details of processing related to the calibration by the calibration unit 500 will be described with reference to the flowchart of FIG. 4. The processing illustrated in FIG. 4 is implemented by the CPU 501 of the calibration unit 500 loading a program stored in the ROM 502 into the RAM 503 and executing the program. At least part of the processing illustrated in FIG. 4 may be implemented by one or a plurality of pieces of dedicated hardware different from the CPU 501. The processing illustrated in FIG. 4 is started at a timing when a plurality of captured images obtained by calibration imaging is stored into the data storage unit 400 and the calibration unit 500 becomes ready to communicate with the data storage unit 400. However, the start timing of the processing illustrated in FIG. 4 is not limited thereto.

In the description of FIG. 4, calibration imaging is performed for a predetermined period while changing the positions of the markers 810, and a plurality of frames of images is stored in the data storage unit 400. Performing calibration using a plurality of frames of images in this way can improve the accuracy of calibration. However, this is not restrictive. The positions of the markers 810 may be fixed during the calibration period. Images captured at a time may be stored into the data storage unit 400, and calibration may be performed by using the images.

In step S101, the calculation unit 510 selects which time (hereinafter, referred to as time T) to obtain the captured images of from the data storage unit 400. In step S102, the calculation unit 510 obtains a plurality of images captured by the plurality of cameras 110 at the selected time T from the data storage unit 400. The images obtained in step S102 include the images of the marker 810a in the air, captured by the cameras 110a included in the in-air camera system 100a. The images obtained in step S102 also include the images of the marker 810w in the water, captured by the cameras 110w included in the in-water camera system 100w.

In step S103, the calculation unit 510 performs detection processing on each obtained image. If a marker 810 is detected from the image by the detection processing (YES in step S103), the processing proceeds to step S104. If no marker 810 is detected (NO in step S103), the processing proceeds to step S105. In step S103, the calculation unit 510 performs detection processing for detecting the marker 810a above water on each of the images captured by the cameras 110a in the air. The calculation unit 510 performs detection processing for detecting the marker 810w in the water on each of the images captured by the cameras 110w in the water. The calculation unit 510 may detect a marker 810 from an image and then determine whether the marker 810 is the marker 810a above water or the marker 810w in the water.

In step S104, the calculation unit 510 records a set (T, N) of the time T and a marker number N read from the detected marker 810, and coordinates (x, y) indicating the position of the marker 810 in the image, in association with identification information about the camera by which the image is captured. In step S105, the calculation unit 510 determines whether the detection processing of the markers 810 has been performed on all the frames of calibration images stored in the data storage unit 400. If there is a frame of images on which the detection processing has not yet been performed (NO in step S105), the processing returns to step S101. In step S101, the calculation unit 510 selects the time T of the unprocessed frame. If all the frames of images have been processed (YES in step S105), the processing proceeds to step S106.

In step S106, the input unit 520 obtains position information about the markers 810 and calculation initial values of the positions and orientations of the cameras 110. The position information about the markers 810 indicates a positional relationship between the marker 810a in the air and the marker 810w in the water. For example, the input unit 520 obtains position information about three positions of the marker 810a in the air and three positions of the marker 810w in the water. The position information to be obtained by the input unit 520 is not limited thereto. For example, if the positions of the markers 810 are fixed, the input unit 520 may obtain information indicating the positions of the respective markers 810a and 810w by constant coordinates as the position information. The input unit 520 obtains such information based on inputs corresponding to user operations. However, this is not restrictive, and the input unit 520 may obtain a measurement result of the positions of the markers 810 from an external apparatus.

In step S107, the calculation unit 510 performs calibration processing based on the information recorded in step S104 and the information obtained in step S106 with the time T and the marker number N, i.e., set (T, N), as an index identifier (ID). The index to be the reference of calibration, if an identical marker 810 are captured at different times, is handled as different indexes. Thus, the set (T, N) is handled as an index ID. In step S108, the calculation unit 510 outputs camera parameters obtained by the calibration to the data storage unit 400 for storage. The camera parameters stored in the data storage unit 400 are used to generate a virtual viewpoint image by the image generation unit 600.

In the calibration processing according to the present exemplary embodiment, the detection results of the marker 810a in the air are mainly used to calibrate the cameras 110a in the air. The detection results of the marker 810w in the water are mainly used to calibrate the cameras 110w in the water. By such independent calibration, the camera parameters of the cameras 110a in the air expressed by using coordinates in a coordinate system and the camera parameters of the cameras 110w in the water expressed by using coordinates in another coordinate system are obtained. If a virtual viewpoint image including an image in the water and an image above water, such as a virtual viewpoint image near the water surface, is generated based on the camera parameters obtained in such a manner, an image disturbance can occur due to a difference between the coordinate systems.

Thus, the calculation unit 510 obtains the camera parameters of the cameras 110a in the air and the cameras 110w in the water expressed by using coordinates in a common coordinate system by performing processing based on the position information about the markers 810 obtained by the input unit 520. For example, the calculation unit 510 obtains camera parameters indicating the positions of the cameras 110a in the air in a first coordinate system based on the detection results of the marker 810a in the air from the images captured by the cameras 110a in the air. The calculation unit 510 obtains camera parameters indicating the positions of the cameras 110w in the water in a second coordinate system based on the detection results of the marker 810w in the water from the images captured by the cameras 110w in the water.

The calculation unit 510 converts the camera parameters of the cameras 110w in the water in the second coordinate system into values in the first coordinate system based on the identification results of the markers 810a and 810w identified from the position information obtained by the input unit 520. In this way, the calibration unit 500 obtains the camera parameters of the plurality of cameras 110 in a common coordinate system based on the images captured by the cameras 110a in the air and the images captured by the cameras 110w in the water. An image disturbance can be reduced by generating a virtual viewpoint image using the camera parameters obtained in this way by calibration.

The method for obtaining the camera parameters expressed by coordinate values in a single coordinate system is not limited thereto. For example, the calculation unit 510 may convert the camera parameters of the cameras 110a in the air in the first coordinate system into values in the second coordinate system. For example, the calculation unit 510 may convert both the camera parameters of the cameras 110a in the air in the first coordinate system and the camera parameters of the cameras 110w in the water in the second coordinate system into values in a third coordinate system. The control unit 510 may correct a difference in scale between the coordinate systems by using the refractive index of water in converting the camera parameters. However, the use of the refractive index for coordinate calculations is not indispensable. For example, using a plurality of markers as illustrated in FIG. 5, corrections may be made based on differences between known position information about the markers in the air and in the water and position information calculated from the detection results of the respective markers.

The camera parameters in the first and second coordinate systems can be obtained by using a conventional method for performing calibration based on the detection positions of markers 810 in a plurality of captured images obtained by a plurality of cameras 110. In other words, the camera parameters of the cameras 110a in the air in the first coordinate system can be obtained based on the detection results of the markers 810a from the plurality of images obtained by the in-air camera system 100a. The camera parameters of the cameras 110w in the water in the second coordinate system can be obtained based on the detection results of the markers 810w from the plurality of images obtained by the in-water camera system 100w.

In the foregoing description with reference to FIG. 4, the calibration unit 500 is described to perform the calibration processing after the calibration imaging is ended and the captured images are stored in the data storage unit 400. However, it is not limited thereto. If the calibration imaging is performed for a certain period, the calibration unit 500 may perform the calibration processing in parallel with the image capturing by the cameras 110.

[Installation Example of Markers]

An installation example of the markers 810 in performing the calibration imaging will now be described. In the installation example illustrated in FIG. 5 described above, the marker 810a in the air and the marker 810w in the water are displayed on the same object, i.e., the board 800. In other words, the water surface in the swimming pool is located between the two markers 810 on the board 800. The positional relationship between the position where the marker 810a is displayed and the position where the marker 810w is displayed on the board 800 is determined in advance. The camera parameters with reference to the marker 810*a* and the camera parameters with reference to the marker 810*w* can therefore be appropriately integrated by performing calibration using the position information about the markers 810*a* and 810*w* obtained by the input unit 520.

In performing calibration by using the markers 810 illustrated in FIG. 5, the detection results of the marker 810*w* in the water from the captured images of the cameras 110*a* in the air and/or the detection results of the marker 810*a* in the air from the captured images of the cameras 110*w* in the water may be used. For example, the marker 810*a* in the air expresses information from which the presence of the marker 810*a* in the air can be identified. The marker 810*w* in the water expresses information from which the presence of the marker 810*w* in the water can be identified. More specifically, the marker 810*a* in the air and the marker 810*w* in the water express information from which respective different IDs can be read. The calculation unit 510 determines whether a marker 810 detected from a captured image is the marker 810*a* in the air or the marker 810*w* in the water.

If the calculation unit 510 determines that a marker 810 detected from the captured image of a camera 110*a* in the air is the marker 810*w* in the water, the calculation unit 510 corrects a positional deviation of the marker 810*w* due to optical refraction at the water surface by correcting the detection result with a known relative refractive index. If the calculation unit 510 determines that a marker 810 detected from the captured image of a camera 110*w* in the water is the marker 810*a* in the air, the calculation unit 510 corrects the detection result with the known relative refractive index. The calculation unit 510 then performs calibration by using the corrected detection result in addition to the detection results of the marker 810*a* in the air from the captured images of the camera 110*a* in the air and the detection results of the marker 810*w* in the water from the captured images of the cameras 10*w* in the water. Such a method can improve the accuracy of calibration since the calibration can be performed by using more detection results of the markers 810.

The method for installing the markers 810 for calibration is not limited to the example of FIG. 5. FIG. 6 illustrates another installation example of the markers 810. A board 800-1*a* displaying a marker 810-1*a* and a board 800-2*a* displaying a marker 810-2*a* are installed in the air on the poolside. A board 800-1*w* displaying a marker 810-1*w* and a board 800-2*w* displaying a marker 810-2*w* are installed in the water in the swimming pool. The markers 810-1*a*, 810-2*a*, 810-1*w*, and 810-2*w* are installed at positions capable of being imaged by the cameras 110-1*a*, 110-2*a*, 110-1*w*, and 110-2*w*, respectively. The plurality of markers 810 is fixed during calibration imaging, and the positional relationship between the markers 810 remains unchanged. The input unit 520 obtains position information indicating the positions of the respective markers 810 in a global coordinate system. The calculation unit 510 performs calibration by using identification results of the positions of the markers 810 identified from the position information and the images captured by the respective cameras 110.

If a plurality of markers 810 is installed in such a manner, the markers 810*a* in the air may be installed outside the imaging ranges of the cameras 110*w* in the water, and the markers 810*w* in the water may be installed outside the imaging ranges of the cameras 110*a* in the air. Such installation can prevent the accuracy of calibration from dropping that is caused when the detection results of the markers 810*w* in the water detected from the captured images of the cameras 110*a* in the air are erroneously used for calibration. Similarly, the accuracy of calibration can be prevented from dropping that is caused when the detection results of the markers 810*a* in the air detected from the captured images of the cameras 110*w* in the water are erroneously used for calibration. In such a case, the markers 810*a* and the markers 810*w* may have the same contents.

Alternatively, as described above with reference to FIG. 5, the markers 810 may express information from which the IDs of the respective markers 810 can be read. In such a case, both the markers 810*a* in the air and the markers 810*w* in the water may be included in the captured image of the same camera 110 since the calculation unit 510 can determine whether each of the markers 810 detected from the captured image is a marker 810*a* in the air or a marker 810*w* in the water. This reduces restrictions on the installation of the markers 810. In this case, the detection results of the markers 810*w* in the water from the captured images of the cameras 110*a* in the air and the detection results of the markers 810*a* in the air from the captured images of the cameras 110*w* in the water may be left unused for calibration.

Figure 7A:
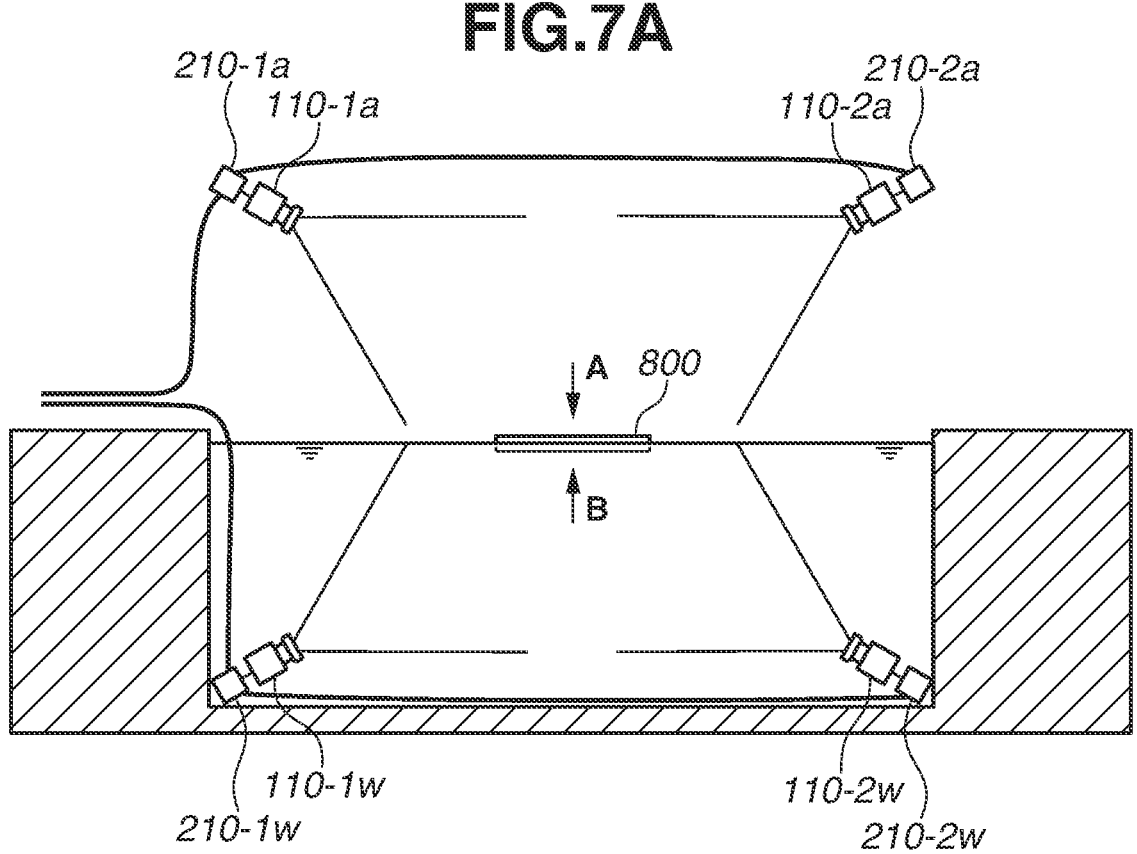
FIGS. 7A, 7B, and 7C are diagrams illustrating an installation example of markers.
Figure 7B:
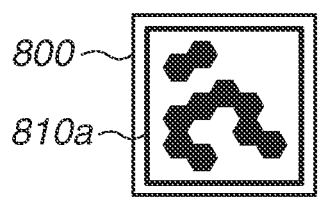
Figure 7C:
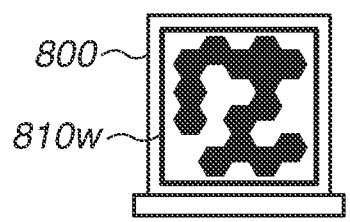

FIGS. 7A, 7B, and 7C illustrate another installation example of the markers 810. In the example of FIGS. 7A, 7B, and 7C, a board 800 is located across the water surface that is the interface between in the air and in the water. The board 800 has a marker 810*a* on its top surface (surface in the air) and a marker 810*w* on its bottom surface (surface in the water). FIG. 7A is a lateral view of the swimming pool where the board 800 is floated on the water surface. FIG. 7B is a diagram illustrating the board 800 seen in the direction of the arrow A in FIG. 7A. FIG. 7C is a diagram illustrating the board 800 seen in the direction of the arrow B in FIG. 7A. Since the board 800 is not fixed, calibration imaging can be performed while moving the board 800. The input unit 520 obtains position information indicating the positional relationship between the markers 810*a* and 810*w*. The calculation unit 510 performs calibration by using the positional relationship between the markers 810 identified from the position information and the images captured by the respective cameras 110.

If the water surface ripples during calibration imaging, the accuracy of calibration can drop due to changes in the tilt of the markers 810. In view of this, at least either one of the markers 810*a* and 810*w* may display information from which the tilt of the markers 810 can be identified. For example, the board 800 may include a gyro sensor or a level, and a marker 810 of different contents may be displayed on a display included in the board 800 based on the tilt detected by the gyro sensor or the level. The calculation unit 510 may determine the tilt of the markers 810 by reading the contents of the marker 810 detected from captured images, and calculate the camera parameters by using the detection results corrected based on the tilt of the markers 810. This can improve the accuracy of calibration in a case where the tilt of the markers 810 changes during calibration imaging. The calculation unit 510 may determine the normal directions to the surfaces of the markers 810, and calculate the camera parameters based on the determination results. As another method, markers including perfect circles may be used to estimate the directions of the markers from the shapes of ellipses included in the captured images.

As described above, the calibration unit 500 according to the present exemplary embodiment detects the marker(s) 810*a* in the air from the images obtained by the cameras 110*a* located above the water surface among the plurality of cameras 110 for capturing images of the imaging region including at least part of the water surface. The calibration unit 500 detects the marker(s) 810w in the water from the images obtained by the cameras 110w located below the water surface. The calibration unit 500 identifies the positions of the plurality of cameras 110 in a common coordinate system based on the detection results of the markers 810 and the position information indicating the positions of or the positional relationship between the marker(s) 810a in the air and the marker(s) 810w in the water.

With such a configuration, the positions of the plurality of cameras 110 in the common coordinate system can be identified even if the plurality of cameras 110 is located on both sides of the water surface that is the interface between the regions in the air and in the water with different refractive indexes. A drop in the image quality of a virtual viewpoint image can be reduced by generating the virtual viewpoint image based on the camera parameters indicating the positions of the plurality of cameras 110 identified in such a manner.

In the foregoing description, the imaging region is described to include a region filled with the air (region above the water) and a region filled with water that is a substance having a different refractive index from that of the air (region in the water). However, the application of the calibration method according to the present exemplary embodiment is not limited thereto. For example, the calibration method according to the present exemplary embodiment can also be applied to improve the accuracy of calibration in a case where the imaging region includes a region filled with the air and a region filled with glass, resin, or oil. In another example, the imaging region may include a region filled with water and a region filled with oil. If the substances filling the imaging region are fluids, especially the air and a liquid in particular, the effect of improving the accuracy of calibration according to the present exemplary embodiment is high since the interface is likely to fluctuate. As employed in the present exemplary embodiment, a substance filling a region refers to one that mainly constitutes the three-dimensional region (e.g., a substance occupying one half or more of the volume of the three-dimensional region).

According to the exemplary embodiment described above, the positions of the plurality of imaging apparatuses in a common coordinate system can be identified even if the plurality of imaging apparatuses is located on both sides of the interference of a plurality of regions filled with substances having different refractive indexes from each other.

[Another Configuration Example of Information Processing System]

Figure 8:
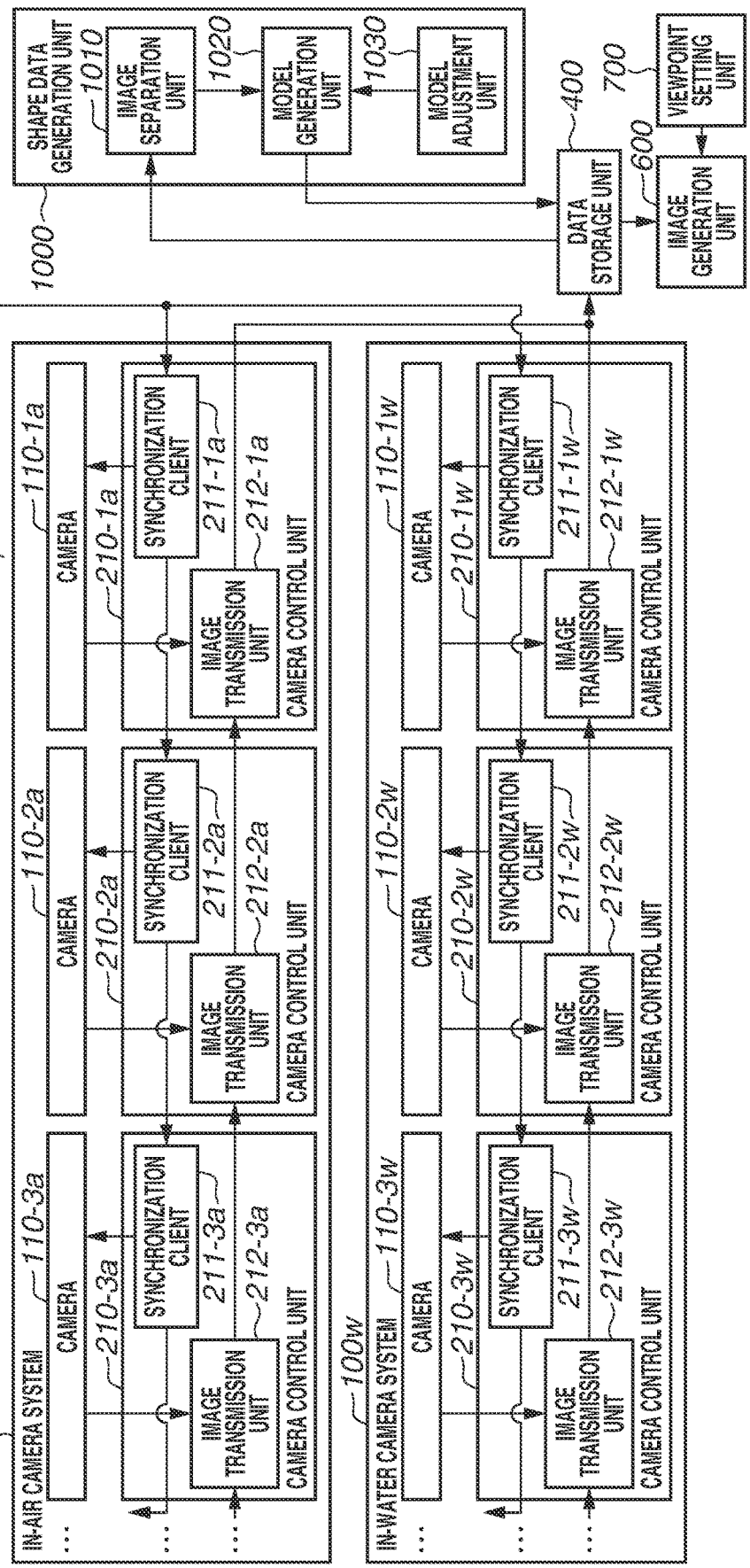
FIG. 8 is a block diagram illustrating a configuration example of the information processing system.

FIG. 8 illustrates another configuration example of the information processing system 10, obtained by modifying the configuration example illustrated in FIG. 2. The difference from the configuration illustrated in FIG. 2 is that the information processing system 10 includes a shape data generation unit 1000. In the present configuration, the information stored in the data storage unit 400 includes object's shape data generated by the shape data generation unit 1000. The shape data generation unit 1000 includes an image separation unit 1010, a model generation unit 1020, and a model adjustment unit 1030, and generates shape data based on images obtained from the data storage unit 400. The shape data according to the present exemplary embodiment is data expressing by a group of points the three-dimensional shape of an object located in the imaging region of which images are captured by the plurality of cameras 110. The contents of the shape data are not limited thereto. For example, the shape data may be data expressing the three-dimensional shape by a polygon mesh. Details of processing for generating the shape data will be described below.

The configuration of the information processing system 10 is not limited to that illustrated in FIG. 8. As an example, the shape data generation unit 1000 and the image generation unit 600 may be configured as one unit. In such a case, the generated shape data may be simply used to generate a virtual viewpoint image without being stored in the data storage unit 400. As another example, the camera control units 210 may include the image separation unit 1010 and output foreground images and background images to the data storage unit 400. In such a case, the shape data generation unit 1000 may obtain a plurality of foreground images from the data storage unit 400 as a plurality of images based on imaging by the plurality of cameras 110.

[Shape Data Generation Processing]

The shape data generation unit 1000 generates shape data on each frame of a moving image obtained by the cameras 110 capturing images of a competition to generate a virtual viewpoint image. In other words, shape data expressing the three-dimensional shape of an object at time T is generated based on a plurality of images captured by the plurality of cameras 110 at time T. The shape data may be generated in real time in parallel with the imaging by the cameras 110, or may be generated based on images stored in the data storage unit 400 after the end of the competition to capture images. In the following description, processing for generating shape data expressing the three-dimensional shape of the object 900 lying both in the air and in the water as illustrated in FIG. 1 based on the plurality of images captured by the plurality of cameras 110, will be described.

Details of the processing related to the generation of the shape data by the shape data generation unit 1000 will be described with reference to the flowchart illustrated in FIG. 9. The processing illustrated in FIG. 9 is implemented by a CPU 501 of the shape data generation unit 1000 loading a program stored in a ROM 502 into a RAM 503 and executing the program. At least part of the processing illustrated in FIG. 9 may be implemented by one or a plurality of pieces of dedicated hardware different from the CPU 501. The processing illustrated in FIG. 9 is started at a timing when a plurality of captured images obtained by the plurality of cameras 110 is stored into the data storage unit 400 and an instruction to generation shape data is input to the shape data generation unit 1000. However, the start timing of the processing illustrated in FIG. 9 is not limited thereto. The processing illustrated in FIG. 9 is repeated for each frame of the captured images.

In step S201, the model generation unit 1020 obtains information, from the data storage unit 400, enabling identification of the position of the water surface that is the interface between the region in the air and the region in the water in the imaging region. The information indicates the height of the water surface in the swimming pool, and is stored in the data storage unit 400 in advance along with the positions of the cameras 110 obtained by calibration. The positions of the cameras 110 and the water surface in the three-dimensional space are expressed by using coordinates in the same coordinate system. However, the contents of the information enabling the identification of the position of the water surface are not limited thereto. For example, the information may indicate the region in the water and the region in the air by using the coordinates of the vertexes or sides of the regions. The model generation unit 102 may obtain the information enabling the identification of the position of the water surface based on a user operation.

Then, the model generation unit 1020 sets a global coordinate system expressing a virtual space corresponding to the imaging region to be imaged by the plurality of cameras 110 based on the information enabling the identification of the position of the water surface. In the present exemplary embodiment, an upward direction perpendicular to the water surface in the swimming pool is referred to as a z-axis positive direction, and the global coordinate system is set so that the water surface corresponds to a plane of z=0. In a space expressed by the global coordinate system set in this manner, a position where the z coordinate is positive corresponds to a position in the air above the water surface. A position where the z coordinate is negative corresponds to a position in the water. If the position of the water surface changes, the water surface position information stored in the data storage unit 400 may be updated. The setting of the global coordinate system in step S201 may be performed at least once during generation of a series of pieces of shape data corresponding to an imaging period, not for each frame of the captured images.

In step S202, the image separation unit 1010 obtains, from the data storage unit 400, a plurality of captured images obtained by the plurality of cameras 110 capturing images in different directions at time T corresponding to the frame to be processed. In step S203, the image separation unit 1010 performs foreground/background separation on the obtained captured images to obtain foreground images and background images. Examples of the technique for foreground/background separation include, but not limited to, a technique of extracting the foreground by using a parallax obtained by comparing the images of adjoining cameras 110.

A foreground image refers to an image obtained by extracting the region of an object (foreground region) from a captured image. The object to be extracted as a foreground region refers to a moving object (moving body) that is moving (can change in absolute position or shape) when a time series of images is captured in the same direction. In this case, suppose that the object 900 that is a person performing in a competition near the water surface in the swimming pool is extracted as a foreground region. However, the object is not limited thereto. Examples of the object may include a person in the field of a game, such as a player and a judge, a ball in a ball game, and a singer, player, performer, and master of ceremonies in a concert or entertainment show.

A background image refers to an image of a region (background region) at least different from the object 900 serving as the foreground. More specifically, a background image is a captured image from which the image of the object 900 serving as the foreground is removed. A background refers to an imaging object that is stationary or maintains in a state close to being stationary when a time series of images is captured from the same direction. In the present exemplary embodiment, the background includes structures such as the swimming pool where the competition is held and the poolside. However, the imaging object serving as a background is not limited thereto. Examples thereof may include a concert stage, a stadium where a game or an event is held, a structure such as goal posts used in a ball game, and a field. The background is a region at least different from the object 900 serving as the foreground. Objects other than the object 900 and the background may be included as imaging objects. For example, the water in the swimming pool may be handled as a background, or handled differently from the foreground and the background.

In step S204, the model generation unit 1020 identifies the three-dimensional shapes of the above-water part and in-water part of the object 900 based on the foreground images obtained in step S203. More specifically, the model generation unit 1020 generates shape data on the above-water part of the object 900 located in the air based on the foreground images extracted from the captured images obtained by the cameras 110$a$ in the air. The model generation unit 1020 also generates shape data on the in-water part of the object 900 located in the water based on the foreground images extracted from the captured images obtained by the cameras 110$w$ in the water. The three-dimensional shape of the entire object 900 is a sum of three-dimensional shapes expressed by the two pieces of shape data.

Figure 10A:
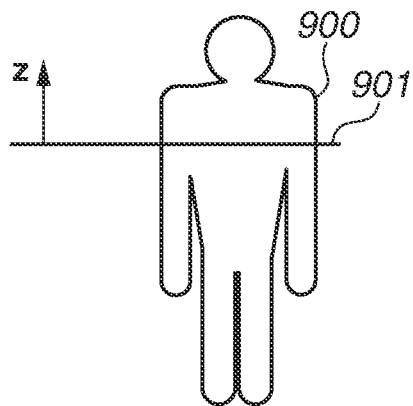
FIGS. 10A, 10B, 10C, 10D, and 10E are diagrams illustrating generation of shape data on each part of an object.
Figure 10B:
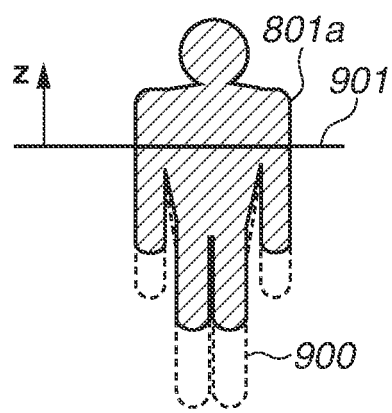
Figure 10C:
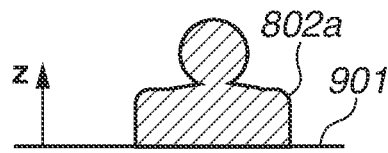

The processing for generating shape data on each of the above-water part and in-water part of the object 900 will be described with reference to FIGS. 10A, 10B, 10C, 10D, and 10E. FIG. 10A illustrates a state where there is a water surface 901 at z=0, and the object 900 is located near the water surface 901 (i.e., standing across the water surface 901). Foreground images are extracted from captured images obtained by the cameras 110$a$ in the air capturing images of the object 900 in the state illustrated in FIG. 10A. FIG. 10B illustrates the shape of a three-dimensional (3D) model 801$a$ expressed by shape data generated from the foreground images.

The part of the 3D model 801$a$ where z<0 is generated based on the images of the in-water part included in the captured images obtained by the cameras 110$a$ in the air. Since the air and water have different refractive indexes, an object in the water appears deformed in the captured images obtained by the cameras 110$a$ in the air due to a change in the refractive index at the water surface 901. As illustrated in FIG. 10B, the part of the 3D model 801$a$ where z<0 has a shape compressed in the z direction, compared to the actual shape of the object 900 illustrated with a broken line. The model generation unit 1020 obtains a 3D model 802$a$ of the above-water part of the object 900 illustrated in FIG. 10C by deleting the part of the 3D model 801$a$ in the water, i.e., the part where z<0. The 3D shape of the above-water part of the object 900 is thereby identified.

Figure 10D:
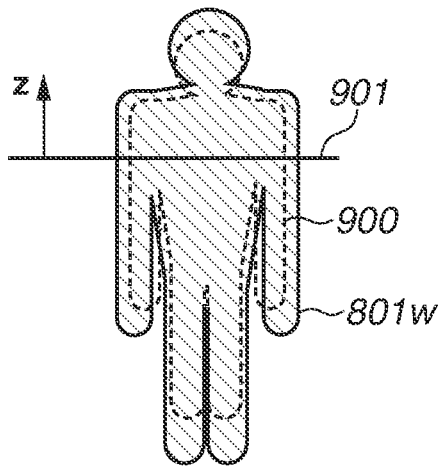
Figure 10E:
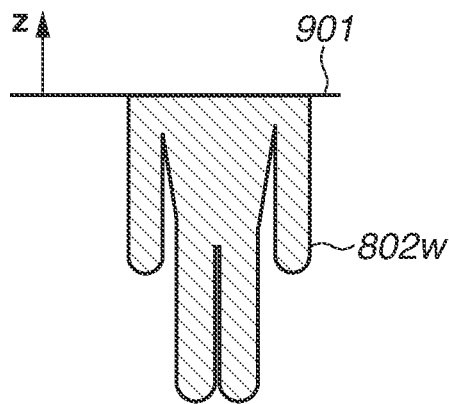

FIG. 10D illustrates the shape of a 3D model 801$w$ expressed by shape data that is generated from foreground images extracted from captured images obtained by the cameras 110$w$ in the water capturing images of the object 900 in the state illustrated in FIG. 10A. The part of the 3D model 801$w$ where z<0 is generated based on the images of the in-water part included in the captured images obtained by the cameras 110$w$ in the water. The part where z>0 is generated based on the images of the above-water part included in the captured images obtained by the cameras 110$w$ in the water. Since the air and water have different refractive indexes, the object 900 in the captured images obtained by the cameras 110$w$ in the water becomes greater than the object 900 in the captured images obtained by the cameras 110$a$ in the air. In other words, the captured images obtained by the cameras 110$w$ in the water look as if captured at focal lengths on the telephoto side of the focal lengths actually set in the cameras 110$w$.

Thus, as illustrated in FIG. 10D, the 3D model 801$w$ differs at least in size, compared to the actual shape of the object 900 illustrated with the broken line. Since an object in the air is deformed in the images captured by the cameras 110$w$ in the water, the part of the 3D model 801$w$ where z>0 can be different from the actual object 900 in shape. In addition, since the captured images obtained by the cameras 110$w$ in the water look as if captured at focal lengths different from those actually set in the cameras 110$w$, the position of the 3D model 801$w$ can be different from the actual position of the object 900. The model generation unit 1020 obtains a 3D model 802w of the in-water part of the object 900 illustrated in FIG. 10E by deleting the part of the 3D model 801W in the air, i.e., the part where z>0. In this way, the 3D shape of the in-water part of the object 900 is identified.

Figure 11A:
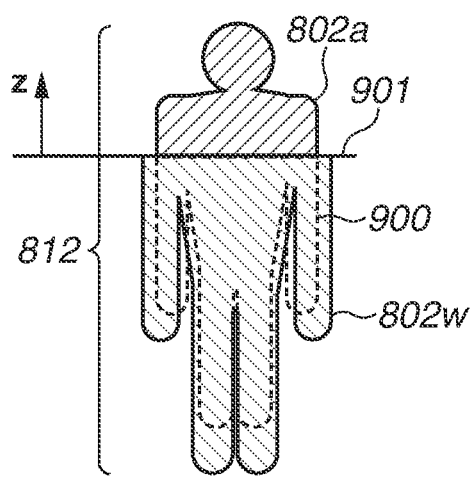
FIGS. 11A and 11B are diagrams illustrating generation of shape data on the entire object.

In step S205, the model adjustment unit 1030 adjusts and combines the 3D models generated in step S204. Details of the processing will be described with reference to FIGS. 11A and 11B. FIG. 11A illustrates the 3D model 812 of the entire object 900 obtained by simply combining the 3D model 802a of the above-water part of the object 900 generated in step S204 with the 3D model 802w of the in-water part of the object 900 at the water surface 901. The part of the 3D model 802w contacting the water surface 901 is greater than the part of the 3D model 802a contacting the water surface 901 due to the refractive indexes. Thus, the 3D model 812 is out of shape at the position of the water surface 901 and unable to correctly express the 3D shape of the object 900.

Figure 11B:
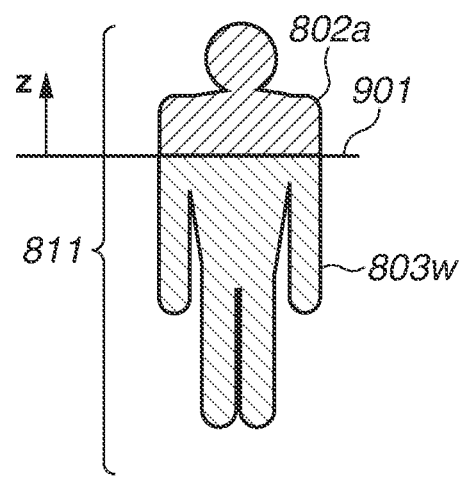

Thus, the model adjustment unit 1030 performs modification processing for modifying at least either one of the 3D models 802a and 802w based on the difference between the 3D models 802a and 802w at the water surface 901, whereby the difference at the water surface 901 is corrected. More specifically, the model adjustment unit 1030 modifies the size of either one of the 3D models 802a and 802w to that of the other. FIG. 11B illustrates a 3D model 811 of the entire object 900 obtained by modifying the size of the 3D model 802w to that of the 3D model 802a and combining the 3D models 802a and 802w at the water surface 901. Since the 3D model 802w is modified in size, the difference between the 3D models 802a and 802w at the water surface 901 is corrected, and the 3D model 811 correctly expresses the 3D shape of the object 900.

If there is a difference in position between the 3D models 802a and 802w at the water surface 901, the model adjustment unit 1030 may modify the position of either one of the 3D models 802a and 802w to that of the other. The model adjustment unit 1030 may modify both the 3D models 802a and 802w so that a difference in position and size between the 3D models 802a and 802w is corrected.

The position(s) and/or size(s) of the 3D models 802 are modified based on cross-sectional shapes of the 3D models 802 on a plane of z=0 corresponding to the water surface 901 where the refractive index changes. More specifically, the model adjustment unit 1030 identifies the cross section of the 3D model 802a and that of the 3D model 802w on the plane of z=0, and modifies at least either one of the 3D models 802a and 802w so that the positions and shapes of the cross sections approach each other. For example, the model adjustment unit 1030 modifies the position of the 3D model 802w so that the gravity center positions of the two cross sections coincide, and modifies the size of the 3D model 802w to minimize difference between the outlines of the two cross sections.

The method for adjusting the 3D models 802 is not limited thereto. For example, the model adjustment unit 1030 may obtain information indicating the refractive indexes of the substances filling the two respective regions with the plane of z=0 as the interface or a relative refractive index between the substances based on inputs made by the user or from an external apparatus. Then, the model adjustment unit 1030 may modify the 3D models 802 based on the obtained information. In the example of the present exemplary embodiment where the plane of z=0 corresponds to the water surface 901, the model adjustment unit 1030 can correct a difference by making the size of the 3D model 802w 1/1.333 times since the refractive index of water is 1.333. If the refractive indexes are known, the accuracy of correction can be improved by using such a method.

In step S206, the model generation unit 1020 generates shape data on the object 900 expressing the 3D model 811 adjusted and combined by the model adjustment unit 1030, and outputs the shape data to the data storage unit 400. The shape data stored in the data storage unit 400 is used for the generation of a virtual viewpoint image by the image generation unit 600. Since the shape data on which the result of the adjustment made by the model adjustment unit 1030 is reflected correctly expresses the 3D shape of the object 900, the object 900 is correctly reproduced in the virtual viewpoint image generated based on the shape data.

If the multi-viewpoint images capturing the imaging region include a plurality of objects each lying across the water surface (i.e., object having above-water part and in-water part), the shape data generation unit 1000 generates 3D models 802a and 802w of the above-water part and in-water part of each object, and associates the 3D models 802a and 802w with the object. Then, the shape data generation unit 1000 performs processing for reducing a difference for each object by adjusting the associated 3D models 802a and 802w, and generates shape data on each object. In this way, correct shape data on each object can be generated even if there is a plurality of objects.

If an object in the imaging region is entirely located in the air, the shape data generation unit 1000 does not need to perform the foregoing adjustment processing on the 3D model of the object generated from the foreground images. If an object is entirely located in the water, the shape data generation unit 1000 may adjust the size of the entire 3D model of the object generated from the foreground images based on the refractive indexes.

In the foregoing description with reference to FIG. 9, the shape data on the above-water part of the object 900 and the shape data on the in-water part are initially generated separately, and at least either one of the pieces of shape data is adjusted to correct a difference at the water surface 901. However, the method for correcting a difference in the shape data of the object 900 is not limited thereto.

For example, the plurality of cameras 110 may be installed and set based on the refractive indexes of the regions where the cameras 110 are installed. If the cameras 110 are installed in the air and in the water, the focal lengths of the cameras 110w in the water may be set to be shorter than those of the cameras 110a in the air so that images can be captured with the same angle of view as that of the cameras 110a in the air. The positions and orientations of the cameras 110 may be adjusted based on the angles of view. Such precise adjustments of the cameras 110 enable correction of a difference in the shape data on the object 900 while reducing processing related to the adjustment of shape data. On the other hand, the method described above with reference to FIG. 9 can simplify the installation and setting of a large number of cameras 110. In addition, a difference can be corrected even if the refractive indexes of the substances filling the respective regions are unknown.

As a method for reducing a difference, for example, the shape data generation unit 1000 may convert the foreground images or captured images for generating the shape data or the camera parameters obtained by calibration based on the refractive indexes. If the cameras 110 are installed in the air and in the water, the sizes of the captured images or foreground images based on imaging by the cameras 110w in the water or the camera parameters of the cameras 110w in the water may be converted based on a change in the focal lengths due to the refractive index of water. The generation of shape data using the foreground images or camera parameters converted in advance enables correction of a difference in the shape data on the object 900 while reducing the processing related to the adjustment of the shape data. In addition, the shape data generation unit 1000 can also directly generate the shape data on the entire object 900 by performing different conversion processes respectively on the above-water regions and the in-water regions in the foreground images, without generating the pieces of shape data on the above-water part and the in-water part of the object 900 separately. On the other hand, the method described above with reference to FIG. 9 can reduce the processing related to the conversion of the images and camera parameters. In addition, a difference can be corrected even if the refractive indexes of the regions are unknown.

In the present exemplary embodiment, the cameras 110 for capturing images of the object 900 are described to be installed both in the air and in the water that are a plurality of regions filled with substances having different refractive indexes. However, the cameras 110 are not limited to such a layout. For example, the plurality of cameras 110 may be installed only in the air. The shape data generation unit 1000 may generate shape data on both the above-water part and the in-water part of the object 900 from the images obtained by the cameras 110a in the air, and adjust the shape data on the in-water part based on the refractive indexes. The shape data on the entire object 900 can be generated by combining the adjusted shape data on the in-water part with the shape data on the above-water part. Such a method facilitates the installation of the cameras 110.

However, if this method is used, the shape data on the in-water part of the object 900 is generated based on the images obtained by the cameras 110a in the air capturing images of the in-water part lying on the other side of the water surface. The water surface not only refracts light but also reflects light and causes a change in the incident angle of light due to rippling. The cameras 110a can therefore fail to capture stable images of the in-water part of the object 900. In such a case, the 3D shape of the in-water part of the object 900 is unable to be accurately identified even by taking the refractive indexes into account, and correct shape data on the entire object 900 may fail to be generated.

On the other hand, the shape data generation unit 1000 according to the present exemplary embodiment identifies the 3D shape of the above-water part of the object 900 from the images obtained by the cameras 110a in the air, and identifies the 3D shape of the in-water part of the object 900 from the images obtained by the cameras 110w in the water. Then, the shape data generation unit 1000 generates the shape data on the entire object 900 based on the identified 3D shapes of the above-water and in-water parts. This prevents the effect of disturbance of the images on the other side of the water surface as seen from the cameras 110 from appearing on the shape data. As a result, correct shape data on the entire object 900 can be generated.

As described above, the shape data generation unit 1000 according to the present exemplary embodiment obtains a plurality of images obtained by the plurality of cameras 110 capturing images of the object 900 lying both in the air and in the water in different directions. The shape data generation unit 1000 generates shape data expressing the 3D shape of the object 900 based on the plurality of obtained images. In generating the shape data, the shape data generation unit 1000 performs processing for correcting a difference, at the water surface 901, between the 3D shape of the above-water part of the object 900 located in the air and the 3D shape of the in-water part of the object 900 located in the water.

Through such a configuration, the shape data expressing the 3D shape of the object 900 can be generated even if the object 900 exist across both regions in the air and in the water with different refractive indexes. A virtual viewpoint image in which the shape of the object 900 is correctly reproduced can be generated by using the shape data generated in such a manner.

In the foregoing description, the refracting surface at which light is refracted in the imaging region is described to be the interface between the region filled with air (above-water region) and the region filled with water that is a substance having a different refractive index from that of the air (in-water region). However, the application of the method for generating shape data according to the present exemplary embodiment is not limited thereto. For example, the method for generating shape data according to the present exemplary embodiment can also be applied to improve the accuracy of the shape data even if the imaging region includes an interface between a region filled with the air and a region filled with a solid substance such as glass and resin or a liquid such as oil. As another example, the imaging region may include a region filled with water and a region filled with oil. If the imaging region includes layers of two types of fluids having different refractive indexes, or a gas layer and a liquid layer in particular, the effect of improving the accuracy of generation of shape data according to the present exemplary embodiment is high since the interface between the layers is likely to fluctuate easily. Even if the object 900 lies across three or more regions filled with different substances, the present exemplary embodiment can be applied to identify the 3D shape of the entire object 900. In the present exemplary embodiment, a substance filling a region is not limited to one that fully occupies the region, and refers to one that mainly constitutes the region (e.g., a substance occupying one half or more of the volume of the 3D region).

According to the exemplary embodiment described above, shape data expressing the 3D shape of an object can be generated even if the object exists on both sides of a refracting surface where light is refracted.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Applications No. 2019-083242, filed Apr. 24, 2019, and No. 2019-108888, filed Jun. 11, 2019, which are hereby incorporated by reference herein in their entirety.

What is claimed is:

1. An information processing apparatus, comprising:
one or more memories storing instructions; and
one or more processors executing the instructions to:
detect a first object located on a first direction side of a refracting surface from images obtained by first imaging apparatuses located on the first direction side of the refracting surface among a plurality of imaging apparatuses configured to capture an imaging region including at least part of the refracting surface, light being refracted at the refracting surface in a three-dimensional space;
detect a second object located on a second direction side of the refracting surface from images obtained by second imaging apparatuses located on the second direction side of the refracting surface among the plurality of imaging apparatuses, the second direction side being an opposite side of the first direction side with respect to the refracting surface, each of the second imaging apparatuses is different from one of the first imaging apparatuses;
obtain position information for specifying at least either one of a positional relationship between the first and second objects and positions of the first and second objects; and
specify positions of the first imaging apparatuses and the second imaging apparatuses in a common coordinate system, based on detection of the first object, detection of the second object, and the obtained position information.

2. The information processing apparatus according to claim 1,
wherein the first object is detected from the images obtained by the first imaging apparatuses, and
wherein the second object is detected from the image obtained by the second imaging apparatuses.

3. The information processing apparatus according to claim 1, wherein the refracting surface is an interface between two types of fluids having different refractive indexes.

4. The information processing apparatus according to claim 1, wherein the refracting surface is an interface between gas and liquid having different refractive indexes.

5. The information processing apparatus according to claim 1, wherein, in the specifying,
first information for specifying positions of the first imaging apparatuses in a first coordinate system is obtained based on the detection of the first object,
second information for specifying positions of the second imaging apparatuses in a second coordinate system is obtained based on the detection of the second object, and
the positions of the first and second imaging apparatuses in the common coordinate system are specified by converting at least either one of the first information and the second information based on the obtained position information.

6. The information processing apparatus according to claim 1, wherein the first and second objects are located at different parts of an object existing across both sides of the refracting surface.

7. The information processing apparatus according to claim 6, wherein the object floats on the refracting surface.

8. The information processing apparatus according to claim 1, wherein the first and second objects are two-dimensional markers having different contents.

9. The information processing apparatus according to claim 1, wherein a marker serving as the first object indicates information for specifying presence of the marker on the first direction side of the refracting surface.

10. The information processing apparatus according to claim 1, wherein a marker serving as the first object indicates information for specifying a tilt of the marker.

11. The information processing apparatus according to claim 1,
wherein an image obtained by a specific imaging apparatus included in the first imaging apparatuses includes the first and second objects, and
wherein a position of the specific imaging apparatus in the common coordinate system is specified using the first object detected from the image obtained by the specific imaging apparatus and not using the second object detected from the image obtained by the specific imaging apparatus.

12. The information processing apparatus according to claim 1,
wherein the first and second objects are detected from an image obtained by the specific imaging apparatus included in the first imaging apparatuses, and
wherein a position of the specific imaging apparatus in the common coordinate system is specified using the first object and the second object detected from the image obtained by the specific imaging apparatus.

13. The information processing apparatus according to claim 1, wherein the one or more processors further execute an instruction to specify orientations of the first imaging apparatuses and the second imaging apparatuses in the common coordinate system.

14. The information processing apparatus according to claim 1, wherein the plurality of imaging apparatuses is configured to obtain a plurality of images to be used to generate a virtual viewpoint image.

15. An information processing method comprising:
detecting as first detection a first object located on a first direction side of a refracting surface from images obtained by first imaging apparatuses located on the first direction side of the refracting surface among a plurality of imaging apparatuses configured to capture an imaging region including at least part of the refracting surface at which light is refracted in a three-dimensional space;
detecting as second detection a second object located on a second direction side of the refracting surface from images obtained by second imaging apparatuses located on the second direction side of the refracting surface among the plurality of imaging apparatuses, the second direction side being opposite from the first direction side with respect to the refracting surface, each of the second imaging apparatuses is different from one of the first imaging apparatuses;

obtaining position information for specifying at least either one of a positional relationship between the first and second objects and positions of the first and second objects; and specifying positions of the first imaging apparatuses and the second imaging apparatuses in a common coordinate system, based on detection of the first object detection of the second object, and the obtained position information.

16. The information processing method according to claim 15,
wherein the first object is detected from the images obtained by an the first imaging apparatuses, and
wherein the second object is detected from the image obtained by the second imaging apparatuses.

17. The information processing method according to claim 15, wherein the refracting surface is an interface between gas and liquid having different refractive indexes.

18. A non-transitory computer-readable storage medium storing a program for causing a computer to execute an information processing method, the information processing method comprising:

detecting as first detection a first object located on a first direction side of a refracting surface from images obtained by first imaging apparatuses located on the first direction side of the refracting surface among a plurality of imaging apparatuses configured to capture an imaging region including at least part of the refracting surface at which light is refracted in a three-dimensional space;

detecting as second detection a second object located on a second direction side of the refracting surface from images obtained by second imaging apparatuses located on the second direction side of the refracting surface among the plurality of imaging apparatuses, the second direction side being opposite from the first direction side with respect to the refracting surface, each of the second imaging apparatuses is different from one of the first imaging apparatuses;

obtaining position information for specifying at least either one of a positional relationship between the first and second objects and positions of the first and second objects; and specifying positions of the first imaging apparatuses and the second imaging apparatuses in a common coordinate system, based on detection of the first object detection of the second object, and the obtained position information.

* * * * *